United States Patent [19]

Ellis

[11] Patent Number: 5,456,413
[45] Date of Patent: Oct. 10, 1995

[54] ROTATING NOZZLE WITH PRESSURE RESPONSIVE CLEARANCE

[75] Inventor: Fife B. Ellis, Houston, Tex.

[73] Assignee: Edward J. Stachowiak, Houston, Tex.

[21] Appl. No.: 262,636

[22] Filed: Jun. 20, 1994

[51] Int. Cl.$^6$ ............................................. B05B 3/06
[52] U.S. Cl. .................... 239/259; 277/27; 277/74; 285/98
[58] Field of Search .................... 239/251, 259, 239/252; 285/98, 106, 107; 277/27, 71, 74

[56] References Cited

U.S. PATENT DOCUMENTS

| | | | |
|---|---|---|---|
| 904,692 | 11/1908 | Greve et al. | 285/98 |
| 3,036,846 | 5/1962 | Peras | 285/106 |
| 3,950,045 | 4/1976 | Hart | 239/259 |

Primary Examiner—Karen B. Merritt
Attorney, Agent, or Firm—Bush, Moseley, Riddle & Jackson

[57] ABSTRACT

A rotary water blast nozzle assembly includes an inner body member and a mandrel that supports a spray head having an internal bushing that rotates on the mandrel. Seals on the of the bushing are spaced at selected distance points from radial flow ports in its center. The resultant of operating pressure forces acting inward on the outside of the bushing between the seals, and gradually diminishing pressures acting outwardly in the clearance from the center toward the ends of the bushing, together with frusto-conically shaped sections of the bushing, cause uniform inward deflection that reduces the clearance in proportion to the operating pressure to inhibit leakby.

17 Claims, 2 Drawing Sheets

ROTATING NOZZLE WITH PRESSURE RESPONSIVE CLEARANCE

FIELD OF THE INVENTION

This invention relates generally to a high pressure rotating waterblast nozzle head that is used to clean surfaces such as the walls of tanks or other vessels made of concrete, steel and the like, and particularly to a nozzle assembly or head that has a pressure energized internal bushing which provides improved reliability and efficiencies as well as easier overhaul or repair.

BACKGROUND OF THE INVENTION

To clean the wall surfaces of a tank or vessel, a number of different rotating nozzle designs have been used. Most of these designs are very similar in construction, and typically include a rotor with one or more nozzle ports or orifices which are supplied with water under high pressure. The nozzle ports are skewed with respect to the axis of rotation at some selected angle to provide a reactive torque which causes the nozzle to spin in operation. High pressure water is transferred to the nozzle by a tubular body having a threaded connection at one end and a long hollow shaft extending from the other end thereof. A tubular bushing provides a rotational interface between the body, which is stationary, and the rotating nozzle. In an effort to prevent leakage, the bushing is machined with tight clearances and typically is pressed into the rotor but slides on the shaft. In many cases an aligned set of holes in the bushing and the shaft transfer high pressure water from the body to the spinning rotor.

A rotating or spinning nozzle provides increased cleaning area coverage as compared to a conventional straight or fanned tip nozzle in a pressure range of from 1000 to 50,000 psi. By covering more area, cleaning times can be reduced to save on cleaning costs. Shortened cleaning time has the additional benefit of reducing wear time on the waterblast components such as the pump and the cleaning gun parts. This reduces the operating costs.

Examples of prior rotating waterblast nozzle assemblies are shown in U.S. Pat. No. 4,821,961, and in the advertising materials of the Hammelmann Corp. dated Oct. 26, 1987 for its so-called "Rotorjet" nozzle. These devices have a similar construction but somewhat different operating characteristics such as rotor speed and flow and pressure requirements. However, these devices are considered to be exemplary of prior devices in the technology to which the present invention relates. These nozzles have very small machining tolerances and very tight clearances, and thus have relatively low reliability when they are subjected to dirty or gritty water, or rough handling or other improper use. Such tolerance and clearances are necessary to prevent excessive leakage or "wasted" water. Any leakage represents essentially lost horsepower that must be paid for with increased fuel or electricity usage at the waterblast pump. To make matters even worse, the amount of leakage or leakby is generally proportional to the operating pressure and becomes worse as the tightly clearanced parts wear in use. When a certain degree of wear occurs the components must be replaced. However in most cases these component parts cannot be easily replaced in the field and generally the assembly must be returned to the manufacturer for a lengthy and costly repair.

An object of the present invention is to provide a new and improved rotating nozzle assembly for high pressure waterblast cleaning that is constructed and arranged to obviate the foregoing problems.

Another object of the present invention is to provide a new and improved rotating nozzle of the type described having reduced clearances under higher pressure to minimize leakby.

Still another object of the present invention is to provide a new and improved nozzle assembly of the type described which is simple in construction, more efficient in operation, and easier and more economical to maintain and operate than prior devices.

SUMMARY OF THE INVENTION

These and other objects are attained in accordance with the present invention through the provision of a nozzle assembly including a generally annular sprayhead having orifice means on its front end which are directed such that rotational reaction forces are produced as water issues therefrom which cause the head to rotate about its longitudinal axis. The head has a central axial bore which receives a hollow bushing having an outwardly directed thrust flange on its inner end. The bushing carries an external seal ring near each of its ends that engages wall surfaces of the bore in the spray head to prevent fluid leakage. Several radial holes are formed in the center of the bushing to allow water under pressure to flow toward the orifice means. A hollow shaft or mandrel fits easily into the bore of the bushing from its ranged end. Several radially directed holes in the walls of the mandrel communicate its center bore with an external annular groove formed in the outer periphery thereof, and such holes and grooves are generally radially aligned with the holes in the bushing. The inner end of the mandrel is formed with an enlarged annular head which fits into a counterbore in the inner body of the assembly, and is sealed with respect thereto by a suitable seal ring. The outer end of the mandrel is attached to a screw which engages the head and holds the parts together.

The seal rings on the outer periphery of the bushing are spaced at selected distances from the radial ports at its center. Preferably the outer surfaces of the bushing which extend inward of the seal rings are conically tapered to lesser diameters adjacent the radial ports. Thus when the nozzle assembly is operating, full operating pressure is applied over the entire outer surface of the bushing between the spaced seal rings, whereas the pressure in the clearance between outer surfaces of the mandrel and the inner surfaces of the bushing diminishes from a maximum at its center to near atmospheric pressure at the outer ends of the bushing. The resultant pressure forces which are developed create substantially uniform stresses on the bushing between the seal rings on account of the frusto-conical cross-sections thereof, which cause the clearance between the bushing and the mandrel to decrease in direct relation to the operating pressure. In other words the bushing is squeezed down radially towards the mandrel to decrease fluid leakby in a progressive manner as operating pressure increases. The amount of clearance reduction can be predictably and accurately controlled by the relationship between the pressure differential between the inside and outside diameters of the bushing, the Young's Modulus of the bushing material and the structural dimensions of the bushing.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which.

DETAILED DESCRIPTION OF A PREFERRED EMBODIMENT

Figure 1:
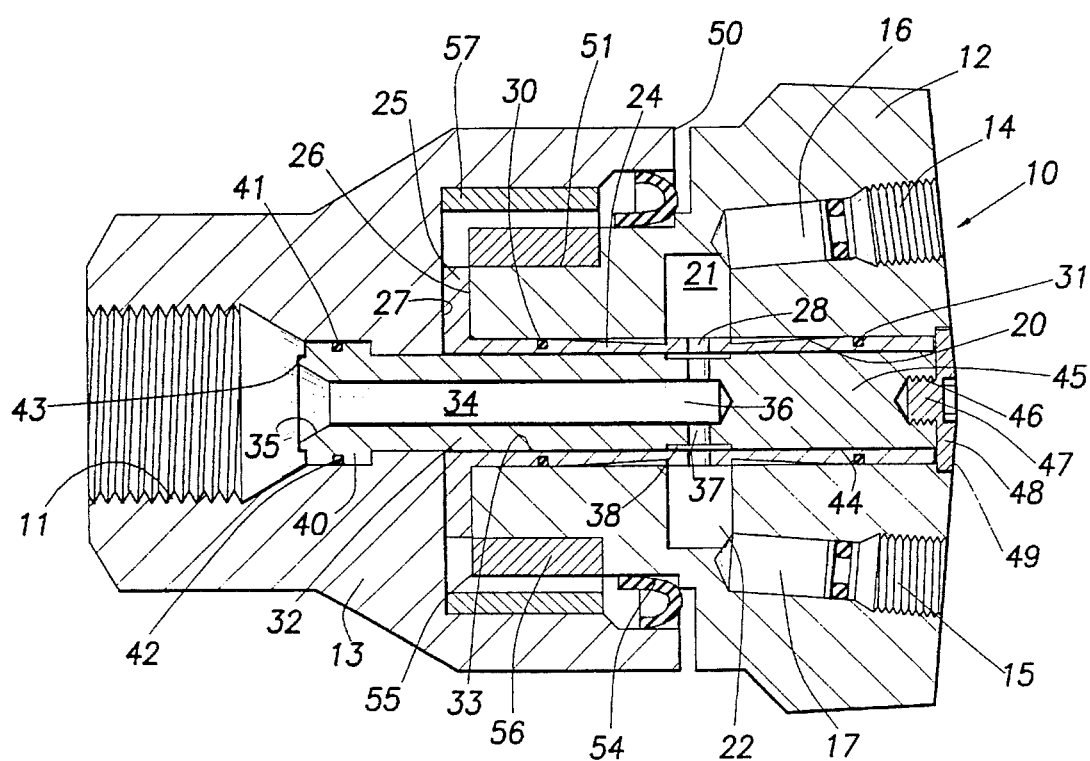
FIG. 1 is a cross-sectional view of a nozzle assembly constructed in accordance with this invention.

Referring initially to FIG. 1, a nozzle assembly 10 which is mounted on the outer end of a wand (not shown) by threads 11 and used in high pressure waterblast cleaning operations includes an outer generally annular body or head member 12 that is rotatably mounted with respect to an inner body member 13. Orifice members 14, 15 are screwed into bores 16, 17 which extend outward at low angles with respect to the longitudinal axis of the assembly, as well as being skewed somewhat with respect to such axis so that reactive forces due to water flow through the orifice members cause the body member 12 to spin or rotate to provide greater cleaning coverage. The head 12 has an internal bore 20 that extends throughout its length, and radial bores 21, 22 which communicate the bore 20 with the respective orifice bores 16, 17.

A hollow bushing 24 fits within the bore 20 and has an outwardly directed flange 25 on its inner end. The flange 25 engages between the rear wall 26 of the head 12 and a front wall 27 in the inner body member 13 to provide a thrust bearing between these surfaces. The bushing 24 has a plurality of radial holes 28 formed through its wall at the center thereof, and external annular grooves which preferably are formed at equal distances from the centers of these holes receive seal rings 30, 31. The seal rings 30, 31 engage surrounding wall surfaces of the head bore 20 and prevent fluid leakage. The seal rings 30, 31 having a selected amount of squeeze when positioned between such surfaces and the bottoms of their grooves.

A mandrel 32 fits into the bore 33 of the bushing 24 and has a central flow passage 34 that extends from a flared surface 35 at the rear thereof to a region 36 which is opened to the outside by a plurality of radial holes 37 that open into an external annular groove 38 formed in the outer periphery of the mandrel. The inner end of the mandrel 32 has an enlarged diameter flange 40 that seats in a counterbore 41 in the inner body member 13, and a seal ring 42 on the flange prevents fluid leakage. The inner end portion 43 is reduced to substantially the same diameter as the outer surface 44 of the mandrel 32 for a purpose to be described below. The outer end portion 45 of the mandrel 32 has a threaded bore 46 that receives the threaded shank 47 of a retaining screw 48 whose head engages the outer end face of the mandrel. When tightened the screw 48 holds the head 12 against the body member 13 while allowing the head and the bushing 24 to rotate relative to the mandrel 32.

The head 12 has stepped rear surfaces 50, 51 which are located underneath similar inner surfaces on the inner body member 13. A rearward facing lip-type seal ring 54 preferably is located between the surface 50 and the surrounding inner surface. In order to control the rotational speed of the head 12 in use, an eddy current magnetic brake 55 can be employed. The brake includes a plurality of angularly spaced magnets 56 which rotate within a stator 57 and provide a governor action which holds rotational speed to a maximum value which provides sufficient dwell time for good cleaning efficiency. Such brakes are well known, and the specific details thereof form no part of the present invention.

Figure 4:
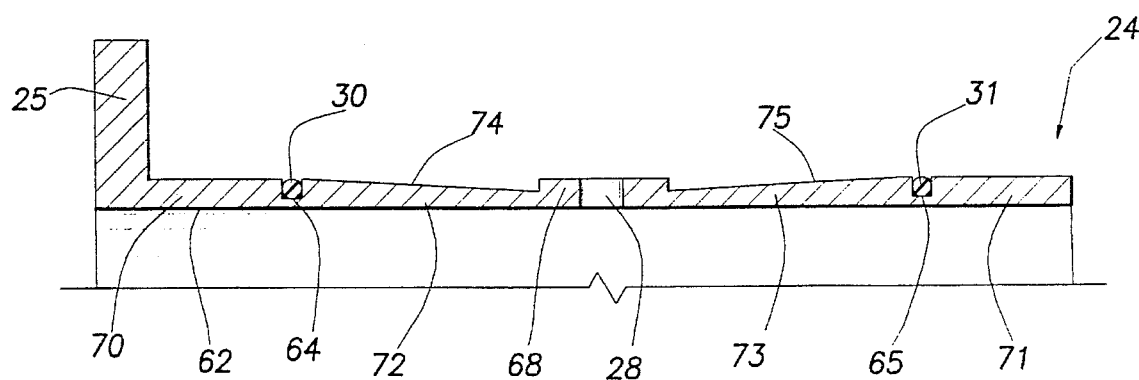
FIG. 4 is a quarter sectional view of the bushing of the present invention.

As shown in more detail in FIG. 4, bushing 24 has a cylindrical inner bore 33, a plurality of radial ports 28 through which water under pressure flows into the spray head chambers 21, 22, and external annular grooves 64, 65 that receive seals 30, 31. The radial centerlines of the grooves 64, 65 preferably are formed at equal distances from the radial centerlines of the ports 28. The radial ports 28 extend through a central portion 68 having the same outer diameter as the end portions 70, 71 beyond the seal ring grooves 64, 65. However the sections 72, 73 which extend between the inner side walls of the grooves 64, 65 and the outer side walls of the central portion 68 have external surfaces 74, 75 that taper uniformly inward so that these sections are frusto-conical, and have minimum outer diameters adjacent the central portion side walls.

Figure 2:
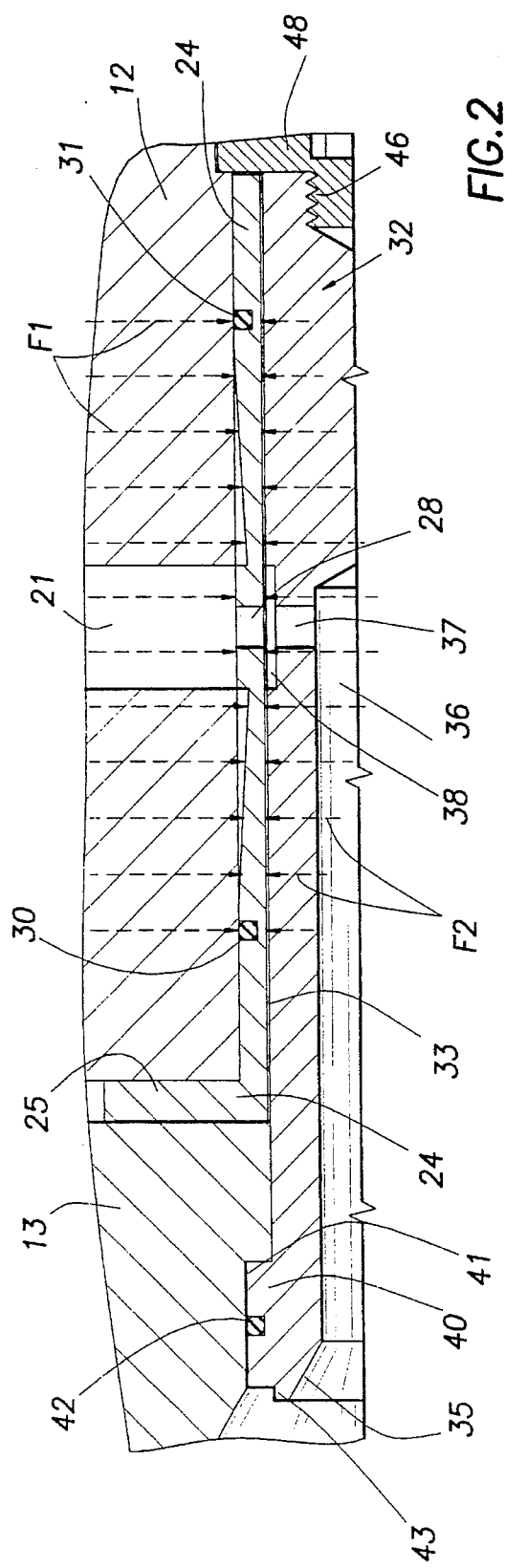
FIG. 2 is an enlarged, fragmentary view showing the distribution of pressure forces on the outside and inside of the bushing when the spray head is operating.
Figure 3:
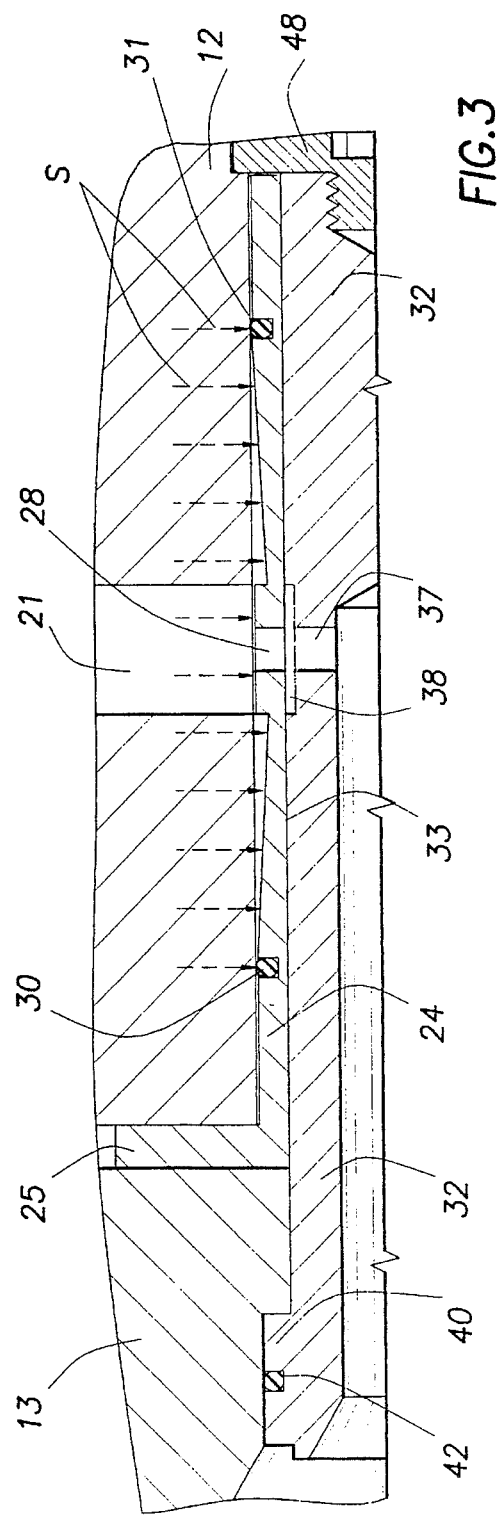
FIG. 3 is a view similar to FIG. 2 showing the resultant pressure forces on the outside of the bushing.

The manner in which pressure forces act on the bushing 24 is illustrated in FIGS. 2 and 3. The pressure of fluids passing outward through the holes 28 and into the radial bores 21, 22 acts on the outer diameter of the bushing 24 in the region between the seal rings 30, 31 as shown by the radial force lines $F_1$. The force lines $F_1$ have a substantially constant magnitude through the section. At the same time, the pressure of fluids passing outward via the mandrel holes 37 and the external annular groove 38 act in the annular clearance between the inner diameter of the bushing 24 and the outer diameter of the mandrel 32 to produce a distribution of forces shown by lines $F_2$. These forces have their maximum adjacent the groove 38 and then progressively decrease in value toward each end of the bushing 24 where they diminish to near atmospheric pressure. The resultants of these pressure forces progressively increase outward from each side edge of the central portion 68 of the bushing 24 to maximum values adjacent the seal rings 30, 31. Since the cross-section area of the sections 72, 73 diminish inwardly, the stresses generated therein are substantially uniform. In this manner, the diametrical clearance between the mandrel 32 and the bushing 24 decreases uniformly as the pressure of fluids flowing through the spray nozzle assembly increases. In other words there are localized changes in the inside diameter of the bushing 24 which reduce the clearance between it and the outer wall surfaces of the mandrel 32. The reduction in clearance causes a corresponding reduction in leakage, and the amount of reduction becomes greater as the operating pressure is increased.

The radial change (b) in the inner diameter of the bushing 24 due to the pressure differential effect noted above can be calculated as follows:

$$b = -\frac{P}{E} \times \frac{(2A^2 B)}{(A^2 - B^2)} \qquad \text{Eq. (1)}$$

Where
P=pressure differential between the inside and outside diameters of the bushing 24 in psi
E=Young's Modulus of Elasticity
A=Outside radius of bushing 24 in inches
B=Inside radius of bushing 24 in inches

OPERATION

In operation the rotating nozzle assembly 10 is threaded to the outer end of a wand or the like having a hand-operated valve which controls the outflow of a cleaning fluid such as water that is supplied by a high pressure pump from a source or reservoir. The water enters the mandrel 32 and passes radially out through the holes 37 and 28 and to the orifice members 14, 15 via the bores 21, 22 and 16, 17. On account of the high pressure, which normally ranges anywhere from 10–50,000 psi, the water exits the ports in the orifice members 14, 15 at extremely high velocity and impinges on the wall surface being cleaned with high power in order to remove various undesired substances therefrom. The orifice members 14, 15 are skewed in opposite directions relative to the longitudinal axis of the head 12 so that reaction forces are applied which cause the head and orifice members to rotate relative to the inner body member 13 and the mandrel 32. The eddy current governor 55 limits the rotational speed to achieve an efficient cleaning action. The seal rings 30, 31 prevent fluid leakage past the respective locations where they engage the walls of the bore 20 of the head 12, and the seal ring 42 prevents leakage between the inner body member 13 and the flange 40 on the mandrel 32. The diametrical clearance between inside walls of the bushing 24 and the outside walls of the mandrel 32 is controlled by machining tolerances which can be somewhat large so that at low operating or start-up pressures, residual particles can escape to provide an easier starting rotation.

As fluid pressures are increased to higher values, a pressure bias develops as explained above which reduces the clearance and thus the leakage between the mandrel 32 and the bushing 24 in a manner such that the leakage is inversely proportional to the operating pressure, as opposed to typical deigns where the opposite is true. This feature makes the present invention operate more reliably with higher efficiency.

With the structure of the bushing 24 as illustrated in FIG. 4 the increasing resultant pressure differentials act on the frusto-conical sections 72, 73 in a manner such that substantially uniform inward deflection is achieved. The wall thickness of each section is greater in the region of higher pressure differentials, and lesser in the region of lower pressure differentials. This construction provides a substantially uniform inward deflection over the length of each section.

In the event the bushing 24 should need replacement, it can be easily pushed out of the head 12 after the body has been removed by unthreading the screw 47 and pulling the head outward off of the mandrel 32. The mandrel 32 then is pushed rearward and out of the body 13. The stepped diameter shoulder 43 on the end of the mandrel 32 is easily used as a tool to push the bushing 24 rearward of the head 12. Once the bushing 24 and the mandrel 32 have been removed, a replacement kit containing new components can be reinstalled very simply for a quick rebuild. This has the advantage of reduced downtime which translates into reduced operating costs. The foregoing features in combination provide a self-rotating nozzle design which is simple in construction, more efficient and reliable in operation, and easier and more economical to maintain and operate than other nozzle assemblies of this type.

It now will be recognized that a new and improved rotating nozzle assembly having a unique pressure compensation or bias feature has been provided. Since certain changes or modifications may be made in the disclosed embodiment without departing from the inventive concepts involved, it is the aim of the appended claims to cover all such changes and modifications falling within the true spirit and scope of the present invention.

What is claimed is:

1. In a fluid blast nozzle assembly having a spray head mounted for rotation relative to a mandrel, the improvement comprising: a bushing mounted between said head and said mandrel, said bushing having a plurality of radial flow ports formed centrally thereof; external seal means on said bushing on opposite sides of, and at selected distances from, said flow ports, said seal means engaging said spray head to prevent fluid leakage therebetween, whereby the pressure of fluids flowing through said ports acts radially inward on said bushing between said seal means to cause the amount of clearance between said bushing and said mandrel to decrease with increasing flow pressures and thereby inhibit leakage of said fluids through said clearance.

2. The nozzle assembly of claim 1 wherein said selected distances are substantially equal.

3. The nozzle assembly of claim 1 wherein said bushing has a central portion through which said flow ports extend, and frusto-conical sections extending from said seal means to said central portion, each of said frusto-conical sections having its minimum outer diameter adjacent said central portion.

4. The nozzle assembly of claim 1 wherein said bushing has an outwardly directed annular flange on an inner end thereof, said flange providing a thrust bearing for rotation of said spray head.

5. The nozzle assembly of claim 4 wherein said mandrel has an axial passageway therein for the flow of fluids under pressure, and radial port means for communicating said passageway with said radial flow ports in said bushing.

6. The nozzle assembly of claim 5 wherein said mandrel has an enlarged diameter portion adjacent the inner end thereof having substantially the same diameter as an outer diameter of said bushing to enable said mandrel to be used as a tool to remove said bushing from said head.

7. The nozzle of claim 6 wherein said mandrel has an inner end portion having substantially the same diameter as the inner diameter of said bushing to center said enlarged diameter portion in alignment with said mandrel during removal.

8. A fluid blast nozzle assembly, comprising: a body member having an axial bore and adapted to be connected to a source of fluid under high pressure; a mandrel sealed with respect to said bore and projecting outward thereof, said mandrel having an axial flow passageway and a plurality of radial flow ports adjacent the outer end of said passageway; a spray head having an axial bore and carrying orifice means for projecting sprays of fluid onto a surface being cleaned; tubular bushing means received in said axial bore of said spray head and mounting said head for rotation of said mandrel, said bushing means having a plurality of radial flow ports which are aligned in the same radial plane with said mandrel flow ports; and seal means between external surfaces of said bushing means and said bore of said spray head, said seal means being located at selected distances on opposite sides of said flow ports, there being annular clearance between internal surfaces of said bushing means and external surfaces of said mandrel, whereby the pressure of fluids flowing through said ports toward said orifice means act radially inward on the outer periphery of said bushing means between said seal means to reduce said clearance and inhibit fluid leakage therethrough.

9. The nozzle assembly of claim 8 wherein said selected distances are equal.

10. The nozzle assembly of claim 8 wherein said bushing means includes an outwardly extending annular flange on its inner end which engages between said body member and said spray head to provide a thrust bearing.

11. The nozzle assembly of claim 8 wherein said bushing means has frusto-conical sections between said seal means and said flow ports, with the largest diameter of each frusto-conical section being adjacent a respective seal means.

12. The nozzle assembly of claim 8 wherein said radial ports in said mandrel open into an external annular recess therein, and wherein the inner end portion of said mandrel has an enlarged diameter to provide a stop flange; and seat means in said body member for receiving said stop flange.

13. The nozzle assembly of claim 12 wherein the outer end portion of said mandrel has an internal threaded bore, and further including screw means engaging said threaded bore and said spray head for fastening said spray head to said body member.

14. The nozzle assembly of claim 8 further including governor means for limiting the rotational speed of said spray head in operation.

15. The nozzle assembly of claim 8 further including additional seal means between said spray head and said body member.

16. Apparatus for use in replacing worn components in a fluid blast nozzle assembly having a rotary spray head, comprising: a tubular bushing having a plurality of radial flow ports, said bushing having an outwardly directed thrust flange at one end; seal means on the outer periphery of said bushing and located at selected distances on opposite sides of said flow ports; and a mandrel adapted to extend through the bore of said bushing and having an axial flow passageway, said mandrel having a plurality of radial flow ports in communication with said passageway and arranged to be radially aligned with said flow ports in said bushing; said mandrel having a stepped diameter inner end portion providing greater and lesser outer diameter sections, said greater diameter section having substantially the same outer diameter as the outer diameter of said bushing, said lesser diameter end section having substantially the same outer diameter as the inner diameter of said bushing to enable said mandrel to be used as a tool to remove a bushing from said spray head.

17. A bushing for use in mounting a rotary spray head on a mandrel, comprising: an elongated generally tubular member having an internal bore, a central section, and opposite end sections spaced from said central section, said end sections having inner ends; radial flow ports through the wall of said central section; external annular groove means in said tubular member at said inner ends of each of said end sections; and frusto-conical sections extending between said groove means and central section, each of said frusto-conical sections having its minimum outer diameter adjacent said central section so that outwardly increasing pressure differentials create substantially uniform inward deflections of said frusto-conical sections.

* * * * *